J. B. SWAN, J. A. ROGERS, AND G. W. JACKSON.
BEDSPRING APPARATUS.
APPLICATION FILED MAY 28, 1921.
1,425,719.  Patented Aug. 15, 1922.
4 SHEETS—SHEET 4.
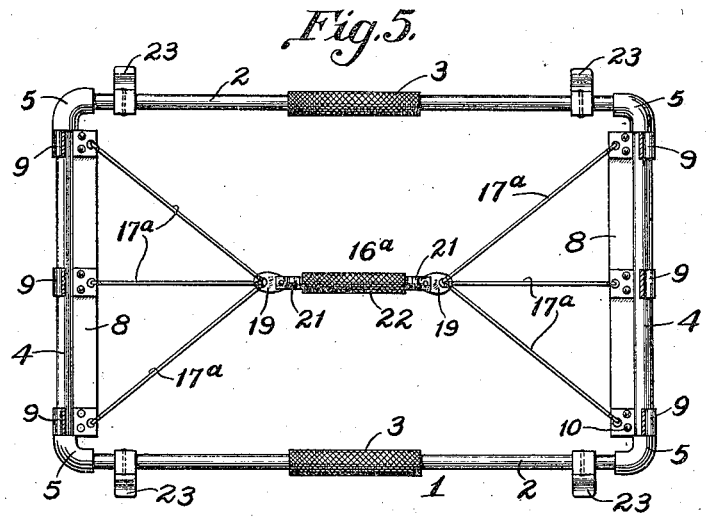
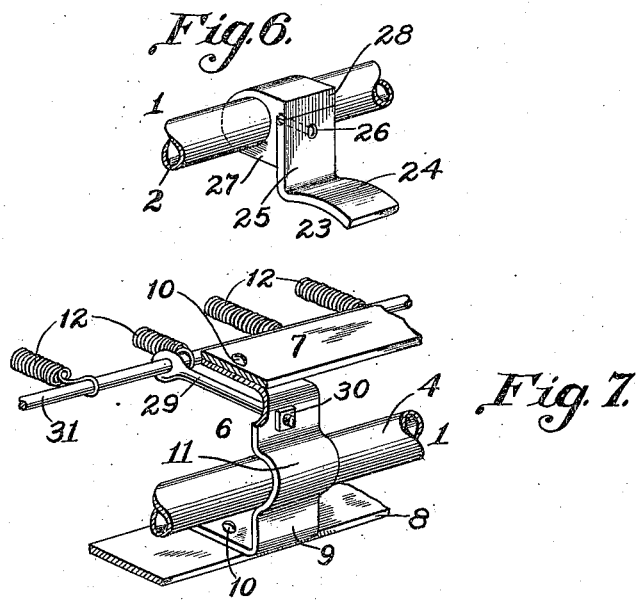
Inventors
John B. Swan, John A. Rogers
AND Glenn W. Jackson.
By
Their Attorneys.

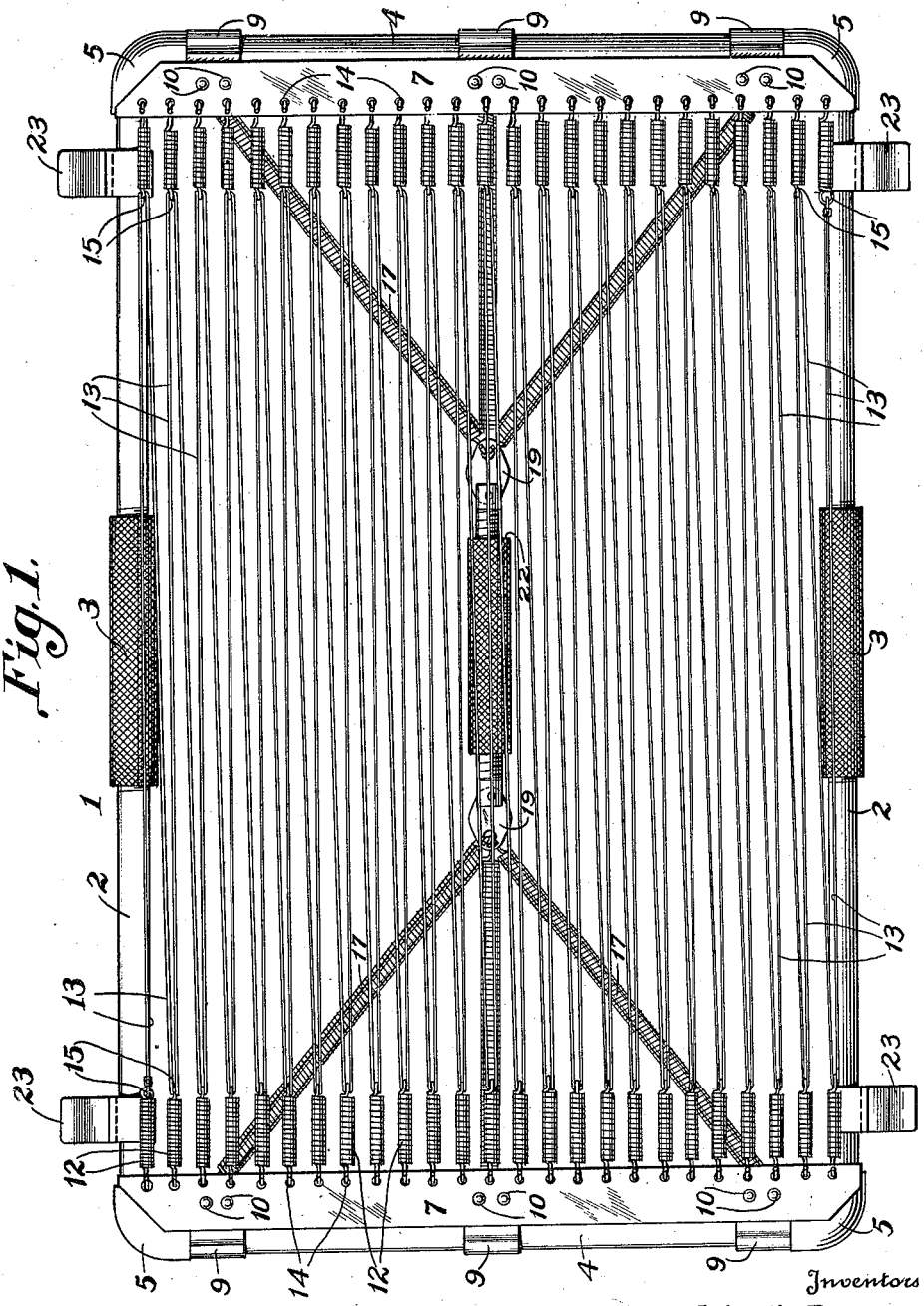

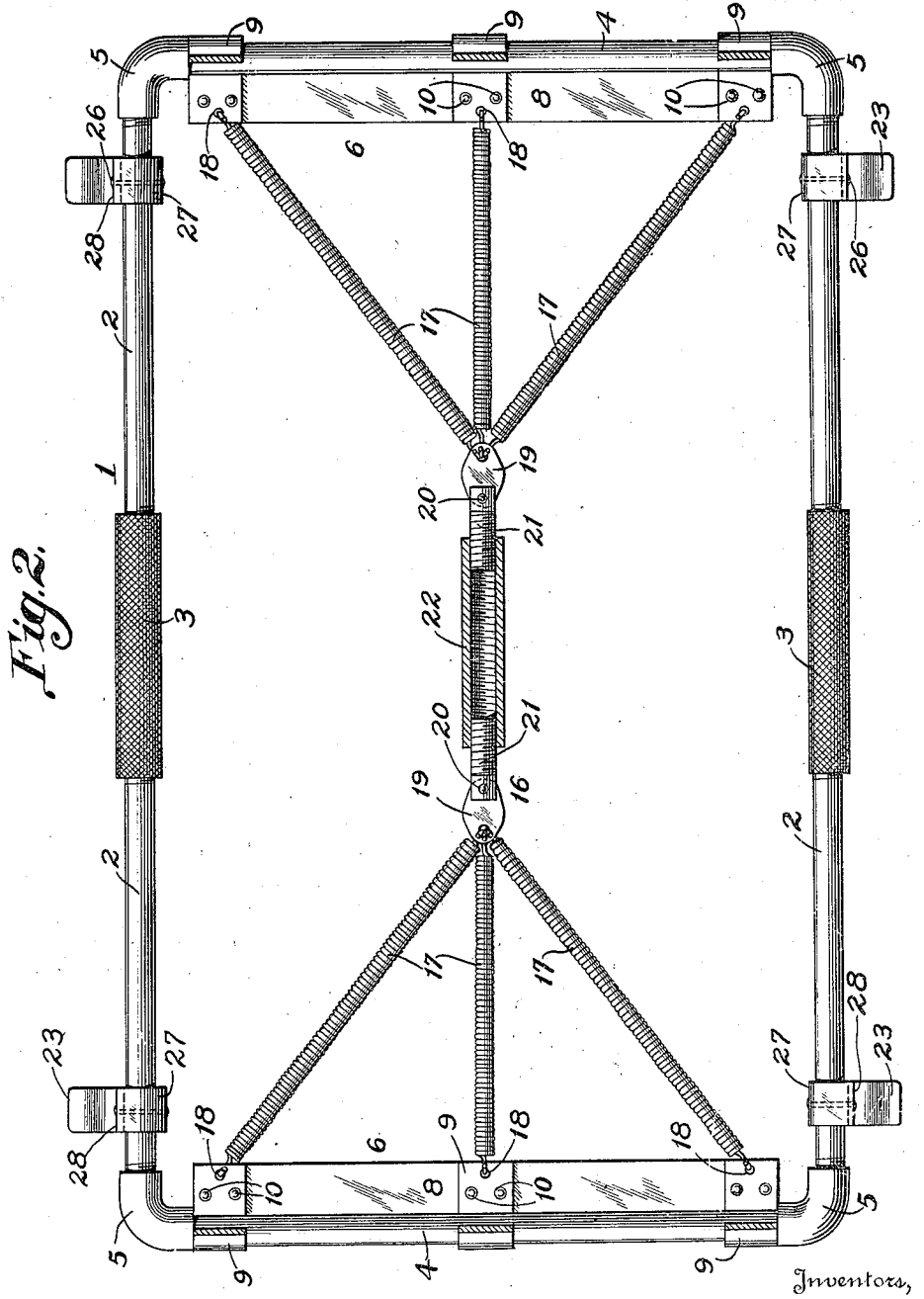

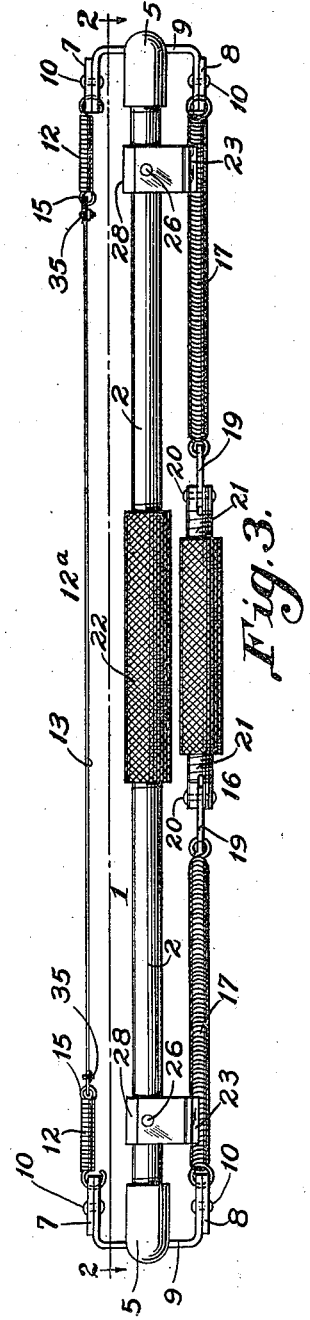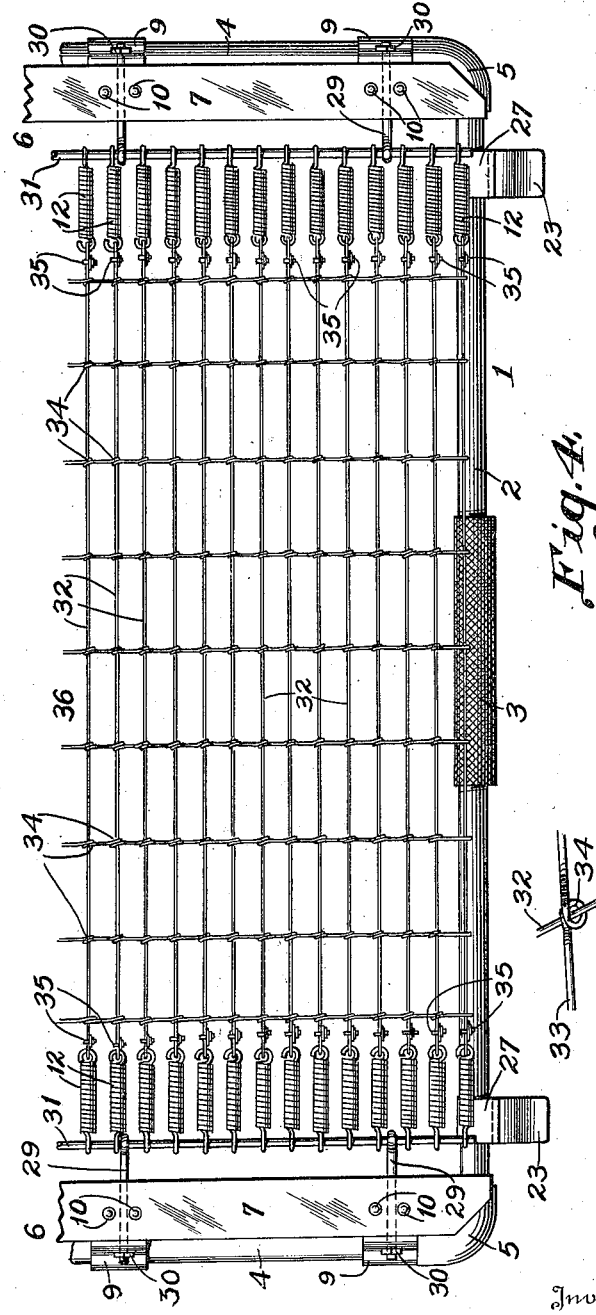

UNITED STATES PATENT OFFICE.

JOHN B. SWAN, JOHN A. ROGERS, AND GLENN W. JACKSON, OF GLADSTONE, MICHIGAN.

BEDSPRING APPARATUS.

1,425,719.   Specification of Letters Patent.   Patented Aug. 15, 1922.

Application filed May 28, 1921. Serial No. 473,232.

*To all whom it may concern:*

Be it known that we, JOHN B. SWAN, JOHN A. ROGERS, and GLENN W. JACKSON, citizens of the United States, residing at Gladstone, in the county of Delta and State of Michigan, have invented certain new and useful Improvements in Bedspring Apparatus, of which the following is a specification, reference being had therein to the accompanying drawings.

This invention relates to a bed-spring apparatus, and the object of the invention is the construction of a comparatively simple and efficient bed-spring apparatus which will permit the adjustment of the tension of the mattress-supporting device to accommodate different loads, and which apparatus will give the maximum amount of use.

With this and other objects in view, our invention comprises certain novel combinations, constructions and arrangements of parts as will be hereinafter described, illustrated in the accompanying drawings, and more particularly pointed out in the appended claims.

In the drawings:

Figure 1 is a top plan view of the apparatus constructed in accordance with the present invention, while Figure 2 is a view, taken on line 2—2, Fig. 3, and looking in the direction of the arrows.

Figure 3 is a view, in side elevation, of the apparatus.

Figure 4 is a fragmentary, plan view of another embodiment of the apparatus.

Figure 5 is a view similar to Fig. 2, but showing another embodiment of the adjusting and tightening device.

Figure 6 is a fragmentary, perspective view of the apparatus showing part of the main frame, and one of the legs thereon.

Figure 7 is a fragmentary, perspective view of the embodiment shown in Fig. 4.

Figure 8 is a fragmentary, perspective view of the embodiment shown in Fig. 4, showing particularly the connection of the single cables and the tie wires of the mattress-supporting device of the apparatus.

Referring to the drawings by numerals, 1 designates the main frame, which comprises the side sectional tubes 2 connected by turn buckles 3; the end tubes 4 are connected to the sectional side tubes 2 by elbows 5.

On the end tubes 4 of the main frame 1 are end frames 6; each end frame 6 comprises a top plate 7, a bottom plate 8 and a plurality of U-shaped yokes 9; the U-shaped yokes 9 are interposed between the top and bottom plates 7 and 8, respectively, and are fastened by rivets 10 thereto. These yokes have an outwardly-bulged body portion 11 that fits upon the end tubes 4 of the main frame 1.

The mattress-supporting device $12^a$ (Fig. 3) includes coil springs 12 and cable 13; the outer ends of coil springs 12 are secured in apertures 14 formed in the top plates 7, and the cable 13 is threaded through the loops 15 formed on the inner ends of springs 12.

The adjusting and tightening device 16 comprises a plurality of springs 17 connected at their outer ends, at 18, to the bottom plates 8, and their inner ends are fastened to disc plates 19. The disc plates 19 are pivotally mounted, at 20, in the bifurcated outer ends of threaded bolts 21. These bolts 21 are threaded onto turn buckle 22, so that by adjusting turn buckle 22, the tension of springs 17 will be controlled, and as the end frames 6 have a slight swinging or rotary movement upon the ends of the main frame, the tension of the mattress-supporting device $12^a$ can be controlled. The tension of springs 12 can also be controlled by adjusting the turn buckles 3 of the main frame.

We preferably place legs 23 on the main frame near each corner so that these legs will rest upon the side rails of the bedstead (not shown). Each leg 23 comprises an outwardly-curved base 24, Fig. 6, and a vertical body 25. The body is fastened by rivet 26 to the outer face of the collar 27 under the shoulder 28; the rivet 26 extends through the body 25, collar 27 and the side tubes 2; the placing of a top edge of the body 25 against the under face of the shoulder 28, together with the positioning of the rivet in the leg, collar and main frame, produces a very permanent and durable connection.

In the embodiment shown in Fig. 5, instead of using the coil springs 17, we use cables $17^a$; otherwise, the embodiment shown in Fig. 5 is the same as that shown in Fig. 2, the difference being in the specific construction of the tightening devices 16 and $16^a$ (Figs. 2 and 5).

In the embodiment shown in Figs. 4, 7 and 8, eye-bolts 29 are fastened by nuts 30 directly to the yokes 9 under the top plates 7. Positioned in the eyes of the eye-bolts are rods 31, and the outer ends of coil springs 12 are placed upon the rods 31. Single cables 32 are employed, each connected to two coil springs 12, and tie wires 33 extend transversely of the apparatus and are looped around, at 34, the cables 32. The ends of the cables 32 (Fig. 4) are fastened to the inner ends of springs 12 by clips 35; by adjusting the turn buckles 3 of the main frame, and the turn buckle 22 of the tightening device, the mattress-supporting device 36, shown in Fig. 4, can be tightened or loosened, at the will of the operator.

It will be understood that our apparatus furnishes a rigid bed-spring with light frame work, which is made so as to permit suitable adjustment that allows the structure to be shortened or extended, thus relaxing or tightening the springs to suit the needs of the individual and to take up the lost tension of coil springs as they grow older in use.

While we have described the preferred embodiments of our invention, and have illustrated the same in the accompanying drawings, certain minor changes or alterations may appear to one skilled in the art to which this invention relates, during the extensive manufacture of the same and we, therefore, reserve the right to make such alterations or changes as shall fairly fall within the scope of the appended claims.

What we claim is:

1. In an apparatus of the class described, the combination of a main frame, end frames positioned around portions of the main frame, each end frame comprising transversely extending top and bottom plates, yokes connected to said top and bottom plates and extending around portions of the main frame, and mattress-supporting and tightening devices connected to said plates of the end frames.

2. In an apparatus of the class described, the combination of a main frame, end frames upon said main frame, each end frame comprising transversely positioned top and bottom plates, a plurality of U-shaped yokes fastened to said top and bottom plates and extending over portions of the main frame, and mattress-supporting and tightening devices connected to said plates of the end frames.

3. In an apparatus of the class described, the combination of a main frame, end frames supported by said main frame, each end frame comprising a top and a bottom transversely positioned plate, a plurality of U-shaped yokes over portions of the main frame and positioned between said plates, fastening means securing the yokes and plates together, each yoke provided with an outwardly-bulged body portion upon the main frame, a yieldably mattress-supporting device connected to the top plates, and an adjusting and tightening device connected to the lower plates of the end frames.

4. In an apparatus of the class described, the combination of a main frame, end frames supported by said main frame, each end frame comprising top and bottom transversely extending plates, a plurality of yokes over portions of the main frame and positioned between said plates, fastening means securing the yokes and plates together, each yoke provided with an outwardly-bulged body portion upon the main frame, a yieldable mattress supporting device connected to the top plates, and an adjustable tightening device connected to the lower plates of the end frames, as and for the purposes set forth.

5. In an apparatus of the class described, the combination of a main frame, a plurality of yokes over portions of the main frame, each yoke provided with an outwardly-bulged body portion upon the main frame, a yieldable mattress supporting device, means connecting the mattress supporting device to the upper portions of said yokes, an adjustable tightening device, and means connecting said adjustable tightening device to the lower portions of said yokes, as and for the purposes set forth.

In testimony whereof we hereunto affix our signatures.

JOHN B. SWAN.
JOHN A. ROGERS.
GLENN W. JACKSON.